June 13, 1967
E. R. KEBBON ETAL
3,324,841
HIGH FREQUENCY IGNITION SYSTEM FOR
AIRCRAFT ENGINES AND THE LIKE
Filed July 24, 1963
4 Sheets-Sheet 2
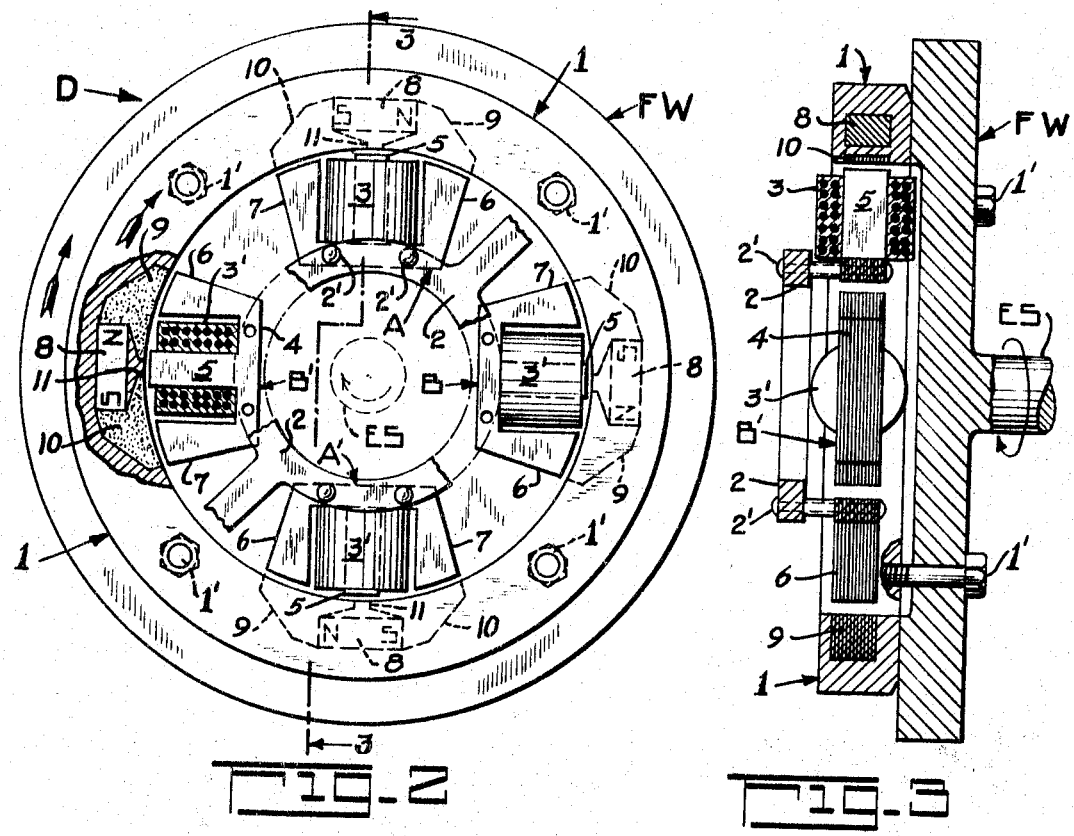
Fig. 2
Fig. 3
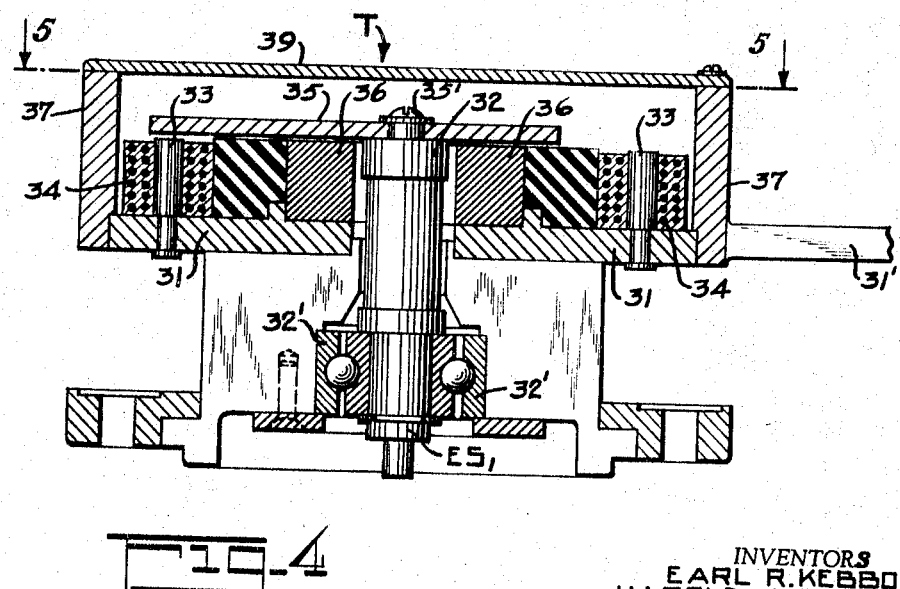
Fig. 4
INVENTORS
EARL R. KEBBON
HAROLD W. McCRAE
HOWARD E. VAN SICLEN
BY Otis R. Severn
THEIR ATTORNEY

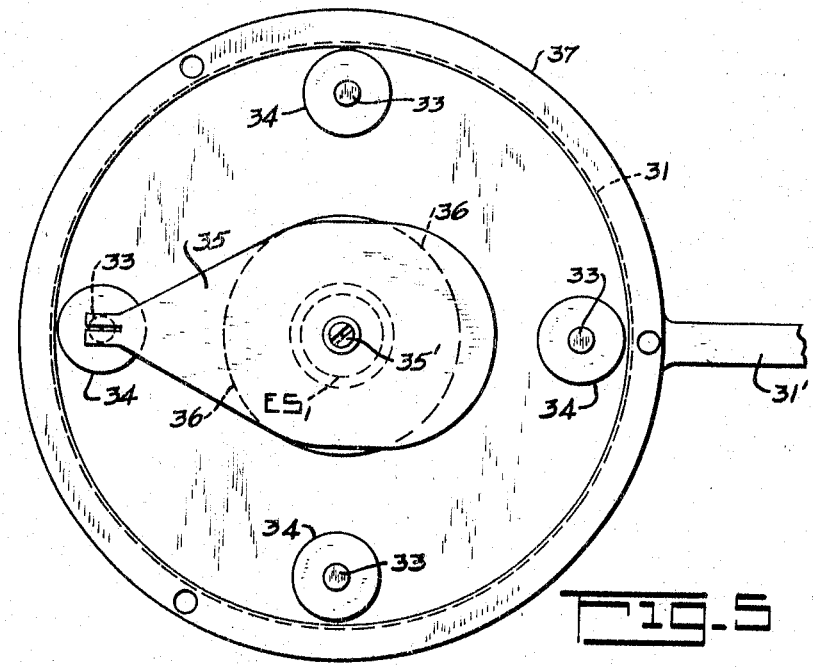
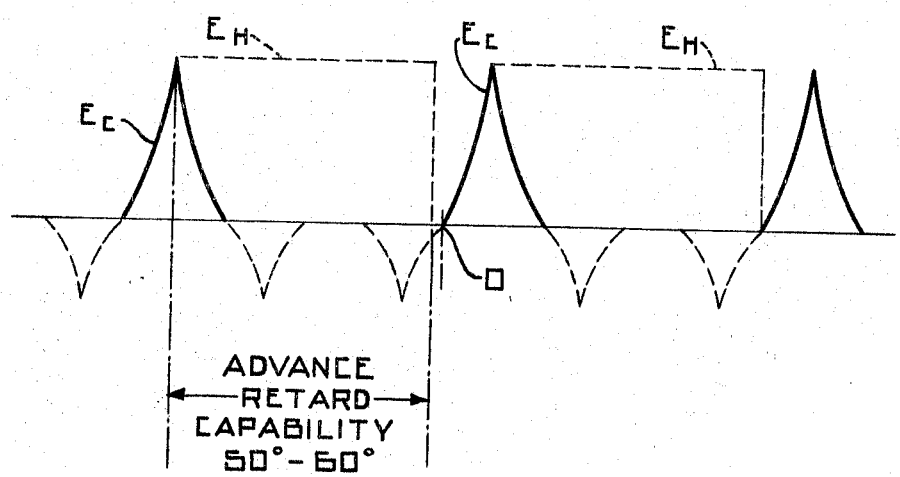

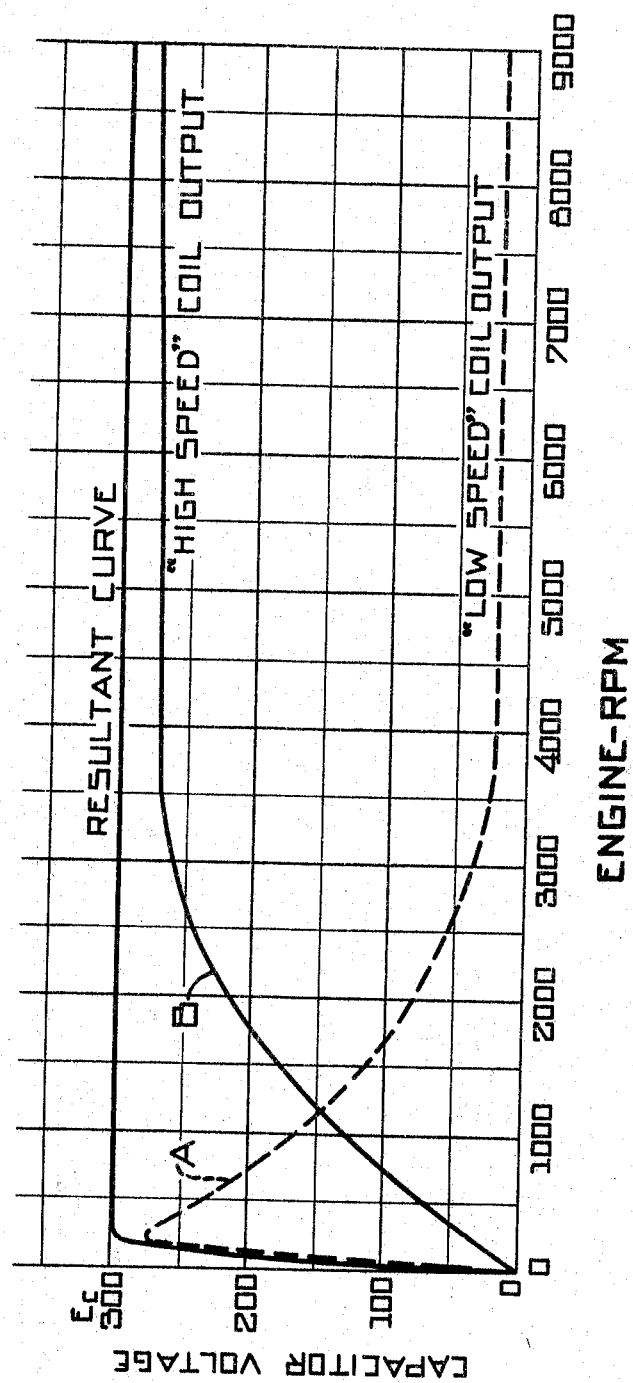

United States Patent Office 3,324,841
Patented June 13, 1967

3,324,841
HIGH FREQUENCY IGNITION SYSTEM FOR AIRCRAFT ENGINES AND THE LIKE
Earl R. Kebbon and Harold W. McCrae, Upper Montclair, N.J., and Howard E. Van Siclen, Jr., Sidney, N.Y., assignors to Curtiss-Wright Corporation, a corporation of Delaware
Filed July 24, 1963, Ser. No. 297,445
10 Claims. (Cl. 123—149)

This invention relates to engine ignition systems of the high frequency pulse type and particularly to dual-ignition systems for internal combustion aircraft engines, wherein the spark plugs are "fired" individually by a high frequency, high voltage pulse of very brief duration. This pulse is produced by directing a timed condenser discharge through the primary of a pulse-type transformer, the secondary of which is connected to a spark plug.

It has long been proposed to use in automotive and aircraft internal combustion engines a contact-timed condenser discharge in various ways for producing the "firing" pulse. In such cases the power supply for charging the condenser may be essentially a battery, or a dynamo-electric device driven by the engine. However, where the speed range of the engine is comparatively wide, i.e. from 100 to 7,000 r.p.m. for example, serious difficulties have been encountered in maintaining at all times a satisfactory plug firing voltage, consistent with desired life duration of the spark plugs, operating characteristics, etc. For example, a dynamo-electric device may produce sufficient voltage in certain cases for high speed operation but on the other hand, due to decrease in the condenser charging voltage at lower engine speed, the resulting pulse voltage may be insufficient for satisfactory firing at low and idling speeds.

Conversely, when the requirements for low speed operation are met, the operation at high speed is unsatisfactory. Furthermore, where the upper limit of speed exceeds 5,000 r.p.m., neither the battery nor the dynamo-electric power supply systems heretofore used for condenser charging have produced sufficient voltage for satisfactory firing. In a number of other systems of this character excess burning and deterioration of the plug electrodes has been encountered due to excessively high energy of the spark.

For a better understanding of the basic characteristics of condenser discharge, pulse-type engine ignition systems of the type disclosed herein, reference is made to the prior art, including U.S.A. Patents 2,980,822, Apr. 18, 1961, and 3,037,148, May 29, 1962.

A principal object of this invention, therefore, is to provide an improved ignition system of the condenser discharge, high voltage pulse type, especially for aircraft engines, that is effective over a wide range of engine speeds to ensure positive and consistently uniform spark plug firing coincident with a very low rate of plug electrode deterioration, and to ensure precise timing of the firing pulse with minimum need for adjustment and maintenance.

Another object of the invention is to provide an improved ignition system of the above character that preferably utilizes electronic trigger circuitry for charging and discharging the condenser in precisely timed relation to the engine speed and to desired advance-retard settings, and that is not dependent on mechanically operated make-and-break contacts.

A further object of the invention is to provide an improved ignition system of the above condenser discharge type having balanced circuitry for ensuring simultaneous dual-ignition firing of the respective plugs in a cylinder.

In accordance with the invention in a preferred form thereof, individual circuitry, including a discharge condenser and its associated pulse transformer, is used for each spark plug in order to ensure maximum flexibility and dependability of operation. The condenser of each firing circuit is in turn jointly charged by at least two dynamo-electric engine-operated devices, one of which primarily charges the condenser in the low speed range of the engine, and the other primarily charges the condenser in the high speed range. The r.p.m.-induced voltage characteristics of the individual dynamo-electric devices (coils) may be adjusted so that the two characteristic curves intersect at some mid-speed. Accordingly, the resulting voltage characteristic curve can be for practical purposes flat and constant over the speed range. Thus, substantially constant voltage is obtained throughout the entire speed range up to and beyond 10,000 r.p.m., even though such high operating speeds for the engines in question are not contemplated at this time.

The invention will be more fully set forth in the following description referring to the accompanying drawings and the features of novelty will be pointed out with particularity in the claims annexed to and forming a part of this specification.

Referring to the drawings,

FIG. 2 is a plan view of the dynamo-electric component of the system;

FIG. 3 is in part a sectional view of the dynamo-electric component of FIG. 2 together with engine-connected structure;

FIG. 4 is an illustration, partly in section, of the structural arrangement of the timer shown in FIG. 1;

FIG. 5 is a plan view of the aforesaid timer;

FIG. 6 is a chart showing graphically the characteristics of two voltage generating components of the system for jointly charging a timed-discharge condenser; and FIG. 7 is a graph illustrating advance-retard spark capability.

Figure 1:
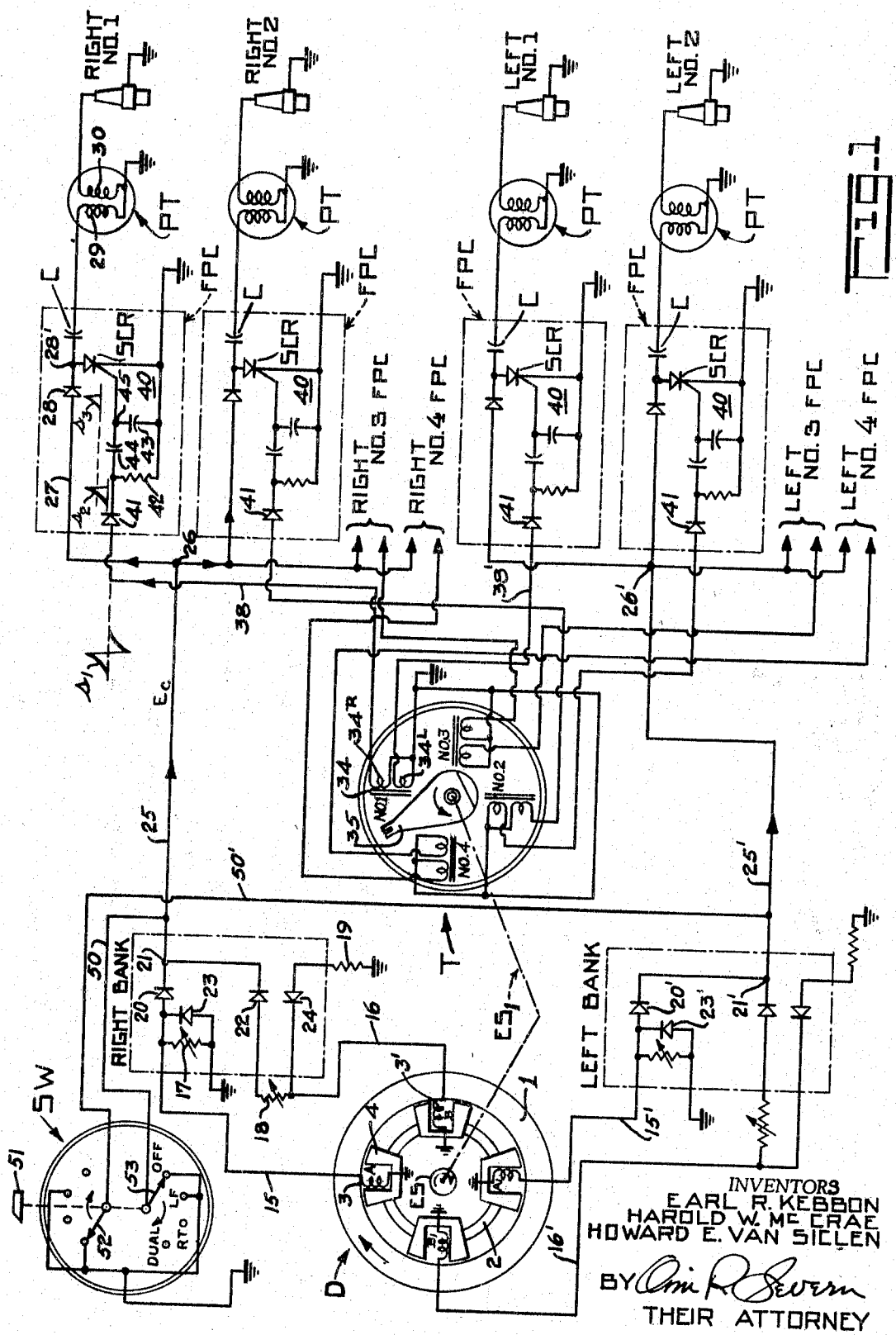
FIG. 1 is a partly diagrammatic and schematic illustration of a preferred ignition system embodying the present invention, including the circuitry and essential components thereof.

The ignition system herein disclosed is especially adapted, although not so limited, to a new type, high speed aircraft engine using rotary pistons, generally referred to as a rotary combustion engine. Specified requirements for this aricraft engine are that the ignition system have no battery or breaker points and that provision be made for mechanical spark advance and retard of at least 60°. The present invention includes these features in an improved integrated ignition system for this and other high speed internal combustion engines, using either single- or dual-ignition systems.

Referring to the general system, FIG. 1, a dual-ignition arrangement is shown wherein the two spark plugs for each cylinder, for example the plug for the right side of cylinder No. 1, and the duplicate plug for the left side of the same cylinder, are for convenience designated RIGHT No. 1 and LEFT No. 1. All the spark plugs and related circuitry for the so-called right-side ignition of the engine cylinders are grouped as "RIGHT BANK," and the corresponding left-side ignition and circuitry as "LEFT BANK." Either bank, of course, can be used separately for single-ignition operation.

Although a 4-cylinder engine is here indicated by way of example, a detailed description of the circuitry for cylinders No. 1 and No. 2 is sufficient for a complete understanding of the invention.

In general, the essential components of the ignition system comprise a primary voltage supply such as a dynamo-electric component D that is operated from the engine shaft ES; rectifying and shaping circuitry labeled "RIGHT BANK" and "LEFT BANK" fed by the dual-ignition outputs of the voltage supply D for each bank respectively; firing pulse control circuitry FPC for each plug including a discharge condenser C; an electro-magnetic timer T also operated as indicated through coupling $ES_1$ from the engine shaft for generating timing pulses that are fed to the respective FPC, these pulses in turn controlling voltage charge and discharge of the condenser C; a pulse transformer PT energized by the voltage discharge of the respective condenser; and a spark plug, RIGHT No. 1, etc., that is individually fired by the output pulse from its associated pulse transformer PT. A main ignition switch SW is arranged for usual "on-off" control, and also for selecting "single" or "dual" ignition, as the case may be.

Referring specifically to the dynamo-electric component D, FIGS. 1 and 2, duplicate pulse generators A, B and $A_1$, $B_1$ are provided for supplying each "RIGHT" and "LEFT" ignition bank with condenser charging voltage. This voltage is the resultant of two component voltages, namely a voltage from a so-called "low speed" generator A and a second voltage from a "high speed" generator B. This is the voltage supply for the RIGHT BANK ignition, a similar resultant voltage being produced by the pulse generators $A_1$ and $B_1$ for the LEFT BANK ignition. For simplification, a description of the operation of the pulse generators A and B for the RIGHT BANK ignition will here be sufficient, it being understood that the circuitry and mode of operation of the LEFT BANK ignition are the same.

Referring to FIG. 2, the dynamo-electric component D comprises essentially a so-called pulse-ring 1 that is rotatable, for example at engine crankshaft speed. This ring can conveniently be bolted to the crankshaft flywheel, FIG. 3, so as to revolve around a fixed multiple coil assembly composed of the pulse generators generally referred to in FIG. 1 as A, B and $A_1$, $B_1$. These pulse generators are mounted on the fixed engine frame or housing in precise concentric relation to the crankshaft and the pulse-ring so as to form a uniform air gap with the pulse-ring. Conveniently, the fixed mounting may comprise a "spider" or the like 2 that in turn is bolted on the engine end-bell (not shown).

Each pulse generator, for example generator A, comprises a coil 3, one terminal of which is grounded and the other terminal connected to the associated rectifying circuitry, FIG. 1. The fixed magnetic circuit of the coil comprises a conventional laminated iron core 4 of E form having a middle leg 5 and outer legs 6 and 7. The end faces of all three legs are concentric with the inner circumference of the pulse-ring 1 and are spaced therefrom to form a short, uniform air gap. The fixed mounting mentioned above for each pulse generator may include through-bolts 2' for clamping the two outer legs 6 and 7 to the fixed spider 2 as indicated in FIG. 3.

The coil 3 is centered on the middle leg 5 in the usual manner so as to be linked by flux established in the aforesaid magnetic circuit.

The coacting movable portion of the magnetic circuit which, together with the stationary part forms a so-called "flux switch," comprises a permanent bar magnet 8 and associated laminated iron pole pieces 9 and 10 respectively. Precision of assembly is obtained here by casting the pulse-ring 1 around the permanent magnet assembly. This eliminates errors in drilling or cutting recesses, etc. in the pulse-ring. The ring is composed of a non-magnetic material, preferably aluminum.

The end faces of the pole pieces 9 and 10 are flush with the inner circumference of the pulse-ring so as likewise to be concentric in relation to the pole pieces 6 and 7 of the fixed circuit. As shown the pole pieces 9 and 10 are proportioned to include the same angle as the fixed legs 6 and 7. A short gap 11 separates the pole pieces 9 and 10.

From the above description, it will now be clear how the device functions as a flux-switch generator. As the rotating pulse-ring carrying the magnet 8 moves into alignment with the coil 3 and its core structure, a flux circuit is established between for example pole N of the magnet, pole piece 9, uniform air gap 12, coil core 4, air gap 12, the other pole piece 10, and the opposite magnet pole S. It will be apparent that the relative position of the middle or coil leg 5 of the fixed core with respect to the pole piece 9 or 10, as the case may be, determines the direction of flux through the center leg, and hence the polarity of the pulse generated in the coil. It will also be apparent that the configuration of the coacting pole pieces and coil core may be varied as desired to produce different voltage wave forms.

The coil 3 of the A pulse generator and the coil 3' of the B generator are wound so as to have different E/r.p.m. characteristics as will be seen from FIG. 6. The A coil has a large number of turns with corresponding high inductance so that its output voltage builds up rapidly at low engine speed, but falls off in well-known manner as r.p.m. increases toward the high range. The B coil has comparatively few turns with corresponding low inductance and hence builds up more slowly. However, due to its low inductance and other well-known factors, it does not fall off at high speeds as in the case of the A coil. Accordingly, the algebraic summation or resultant of the illustrated curves is a substantially flat curve at a voltage level, for example 300 volts, satisfactory for condenser charging in the present system.

The voltage outputs of the A and B coils constitute alternating pulses generally as indicated by FIG. 7. These outputs are fed by leads 15 and 16 respectively to the rectifying and curve shaping circuitry RIGHT BANK which stores and holds the resultant rectified voltage or peak charge on the main discharge condenser C of the corresponding FPC. Specifically, the A coil output is directed through lead 15 to a rectifying diode 20, the output circuit of which includes junction 21. The B coil is likewise directed through lead 16 and variable resistor 17 to a diode 22 that also is connected to junction 21 at which the coil voltages are combined to produce a resultant constant voltage $E_c$. For modifying as desired the pulse wave forms, variable resistors 17 and 18 are connected to the respective coil output circuits. Blocking diodes 23 and 24 connected to ground are also connected to each coil output circuit as shown, the diode 24 being grounded through a resistance 19.

The resultant voltage $E_c$ at junction 21 is fed by lead 25 directly to the main condenser C through junction 26, lead 27 and diode 28. The remainder of the direct firing circuit includes the grounded primary winding 29 of the pulse transformer PT for receiving the condenser discharge, and the grounded secondary winding 30 in which the firing pulse is induced for the grounded spark plug RIGHT No. 1.

In prior practice the condenser is discharged for firing the plug by means of a mechanically operated timing switch interconnecting the charge terminal of the condenser and ground. Closing of the switch in this instance completes the return ground connection to discharge the condenser through the transformer primary. Mechanical timing of the spark in this manner has a number of practical disadvantages including contact erosion, improper adjustment and wear, etc., all tending to impair reliability and precision firing of the plug.

For ensuring practically trouble-free and precise firing under all operating conditions, the present invention provides for electronic triggering of the discharge condenser C throughout a wide range of advance-retard spark control. To this end, a timer T, FIGS. 1, 4, and 5, is driven through the connection $ES_1$ from the engine shaft so as to be in proper synchronism with the pulse-ring 1.

The timer structure, FIGS. 4 and 5, includes a supporting steel disk or plate 31 through the center of which extends a shaft 32 corresponding to the connection $ES_1$. A plurality of soft iron pins 33 corresponding in number to the engine cylinders are mounted on the disk at equal distances around the outer periphery. On each pin a bifilar coil 34 is centered for a purpose presently described. The timer shaft at 32 is of non-magnetic material and has mounted on its overhanging end a rotating armature or pole piece 35 of soft iron generally in the form of a pointer. A permanent magnet 36 of the ring type surrounds the non-magnetic shaft 32 and is closely fitted between the pole piece 35 and base plate 31 so that a magnetic circut is completed each time the pole piece passes a pin 33. The circuit so established comprises the magnet, rotating armature 35, pin 33, and base plate 31 which is magnetically connected to the magnet.

Referring to the circuitry of FIG. 1, the bifilar coils 34 are also designated with reference to the corresponding engine cylinder No. 1, 2, etc. Considering the No. 1 cylinder, the two separate windings 34R and 34L of coil 34 produce the respective timing pulses for firing the RIGHT No. 1 and LEFT No. 1 plugs of this cylinder. The separate wires of each coil are wound side-by-side in known bifilar manner about the common core (pin 33) for obtaining simultaneous trigger pulses from both windings, thereby ensuring simultaneous firing of the dual plugs of each cylinder.

As each individual plug is fired in the same manner, it will be sufficient to explain the triggering action of the winding 34R of bifilar coil 34 for firing RIGHT No. 1 plug. The winding 34R is grounded at one terminal, the other terminal being connected by lead 38 to the gate of a silicon controlled rectifier SCR through a pulse modifying and protective network 40. This network can be generally considered a peak detector, the function of which is well known. Here, the network determines the proper amplitude and shape of the trigger pulse or signal that is fed to the SCR gate; also it limits the duration of this signal so that it is sufficiently brief to prevent shorting of the next following pulse through the SCR as graphically explained by FIG. 7.

The signal on the timer output lead 38, which is indicated as a full-wave signal $s_1$, is rectified by the diode 41 as a positive signal $s_2$ having an amplitude depending on the timer, i.e. engine, speed. The signal $s_2$ which may "peak" as high as 100 volts or more is much too high for the SCR gate and is therefore "clipped" by the protective peak detector network 40 connected to the output of diode 41. This network includes a resistance 42 and condenser 43, both connected across a second condenser 44. The network output junction 45 is connected to the SCR gate as shown for feeding thereto a clipped signal $s_3$ of predetermined amplitude, according to the design of the peak detector. This signal is comparatively low, such as 3 or 4 volts, depending on the specific gating characteristics of the SCR. About 2 volts on the gate are sufficient to start conduction.

It will now be assumed that charging voltage is being held as previously described on the main condenser C, and that the SCR gate receives a trigger signal $s_3$. The SCR thereupon becomes a conductor, thus closing the circuit (in the manner of a switch) between the condenser charged terminal 28' and ground. The condenser thereupon discharges through the grounded PT primary winding 29 to produce the firing voltage for spark plug RIGHT No. 1. Thus, it will be seen that the plug is fired precisely and uniformly exactly in accordance with the trigger pulsing of the timer T, which in turn is operated in synchronism with the engine shaft.

Precision is further enhanced by the restricted base-time control of the brief half-wave signal $s_3$. This signal must drop to zero before the SCR cuts out and opens the circuit. If on the other hand the signal has a wide time base, it will be apparent that the succeeding condenser charging pulse might be shorted throught the SCR rather than charge the condenser. Thus, with no charge held on the condenser at the required firing time, the plug will not fire.

Other advantages of the network 40 include the use of the small condenser 43 in the SCR gate-to-ground circuit to avoid damaging transients. In the event of any accidental short circuit in the external wiring, or PT primary coil 29 (which has low impedance), the SCR peak current merely increases with no harmful results, either as to circuitry or performance of other coils.

The spark advance-retard capability as indicated by FIG. 7 can be as broad as 60°. This again is due to the close control of the time base of the trigger signal described above.

The spark advance-retard is done mechanically at the timer T, either manually or automatically for 60° advance-retard capability throughout the entire engine speed range. For simplicity, manual control is shown wherein the unit comprising the base plate 31 and coils 34, can be rotated by an arm 31'. This unit is shown as rotatable on its engine mount EM relative to the shaft ES, and armature 35. The setting would in practice of course be automatic. Here conveniently, the lower mass armature 35 is loose with respect to the engine shaft and set by well-known fly-weight and cam means connecting the shaft and armature.

A main control switch SW, FIG. 1, of conventional form is connected by leads 50 and 50' to the rectified voltage supply lines 25 and 25' of RIGHT BANK and LEFT BANK ignition respectively. The switch, schematically shown, comprises an actuator 51 for gang operating two movable switch elements 52 and 53. The switch is operable selectively between positions shown representing "dual ignition," single ignition (either RIGHT BANK or LEFT BANK), and "OFF." It is represented conventionally as in "OFF" position wherein it shorts the supply lines 25 and 25'. The control for the other positions will be obvious by inspection.

Summary of operation

The general operation of the improved ignition system described above will here be reviewed to emphasize salient features and advantages of this invention over the prior art systems presently known to applicants.

At the voltage supply source D, voltage regulation over the full speed range of the engine is economically achieved by the use of two voltage generating coils A and B, for example. The outputs of these coils combine to produce for the whole operation a substantially constant condenser charging voltage. This voltage is in turn rectified for half-wave use so as to provide pulse duration time most suitable for precision control of the firing pulse. With this voltage control, the ignition system functions smoothly and uniformly from idling to top speeds to give proper plug firing voltage. The improvement in ignition so obtained is especially marked over prior systems in the high range of engine speed.

Although it should be understood that mechanical switch timing can be used if desired with the present improved constant voltage supply system for uniform plug firing at ordinary speeds, the disclosed electronic timing by means of a trigger pulse from a pulse generator, such as the timer T, is preferred for precision operation, especially at high speeds. This trigger pulse can, as above explained, be restricted to a very narrow time base or dwell so that it can when applied to the SCR gate open and close the discharge circuit through the PT primary 29 within a very brief time interval, thereby ensuring clean-cut individual firing pulses from the PT secondary 30. There is no overlap or "skipping" of firing charges, and it will be apparent upon inspection that the upper speed limit is determined only by mechanical stresses in the engine itself. The electronic triggering herein disclosed also well lends itself to the more advantageous low tension distribution. The dwell period, wear, erosion, etc., inherent in mechanical timing devices on the other hand, severely limit the application thereof to less exacting requirements.

The advance-retard time for an engine depends on the time, or number of shaft degrees, taken to charge the condenser, plus the dwell time of points, where used. Where a single voltage supply coil, such as coil A alone, is used, the charging time (commonly termed phase-shift) increases with engine speed. This time is greatly reduced by using the combined characteristics of both coils A and B, wherein the output of low inductance coil B fully charges the condenser in minimum time at high speeds. As the phase-shift inherent in the coil A output is not serious in the low speed range, it will be seen that materially improved advance-retard time is obtained throughout the entire speed range. This increased time is utilized in optimum manner by the short dwell electronic trigger not only to provide a wide range, such as 60°, of advance-retard capability, but also within practical limits to increase the number of condenser charges per engine revolution for additional plug firings.

The enhanced advance-retard capability of the present invention is made clear by the graph, FIG. 7. It will be seen that the trigger signal after application of the charging voltage $E_c$ can control the held charge $E_H$ on the condenser throughout a comparatively wide angle range. The sole limitation on this capability is that the condenser be triggered and discharged prior to the origin of its next charging cycle, starting at point O on the time base.

The trigger pulse is preferably "spiked" sharply for accurate and precise timing and may be obtained by any suitable pulse generating means synchronized with the engine. The timer T herein shown has operated quite satisfactorily with a gap of about .010 to .015 inch between a pin 33 and the moving armature 35.

In sustained operation of aircraft engines over a considerable time, durability of the ignition system components is highly important. Here, the switching rate for each SCR is essentially low so that less heating of the SCR and consequently greater reliability is obtained. Maintenance is also simplified by avoiding the conventional, often troublesome and more complicated low voltage distributor.

It should be understood that this invention is not limited to specific details of construction and arrangement thereof herein illustrated, and that changes and modifications may occur to one skilled in the art without departing from the spirit of the invenion.

What is claimed is:

1. A high frequency electrical ignition system for internal combustion engines operable over a wide r.p.m. range, said engine having a plurality of combustion chambers with corresponding spark plugs, comprising
   (a) a dynamo-electric device having at least two electro-magnetic generators for producing respective supply voltages, each generator being driven through a common connection with the engine and operating according to a different r.p.m.-voltage characteristic curve,
   (b) an electrical control network for each spark plug including a condenser, and a pulse transformer for receiving the condenser discharge current,
   (c) said network being energized jointly by said supply voltages for charging said condenser at a predetermined minimum level of charging voltage throughout the engine speed range irrespective of variation in engine r.p.m., and
   (d) switching means responsive to engine speed for controlling the periodic discharge of said condenser through the primary of its associated pulse transformer for producing timed firing of the corresponding spark plug.

2. An ignition system as specified in claim 1 wherein the switching means comprises solid-state circuitry that is responsive to biasing potential generated by an electromagnetic timing device according to engine speed, the biasing potential being modified by the solid-state circuitry to produce a trigger signal having a narrow time base and predetermined limited magnitude for precise timing of spark plug.

3. An ignition system as specified in claim 1 wherein each electro-magnetic generator comprises a coil in which the respective supply voltage is induced according to the engine speed, one of said coils having a sufficiently large number of turns to build up voltage at a high rate in the low range of engine speed and the other coil having fewer turns and comparatively low inductance for maintaining without drop-off its output voltage level in the high range of engine speed, and the control network includes means for rectifying and combining the respective coil voltages for maintaining the predetermined minimum level of condenser charging voltage.

4. An ignition system as specified in claim 2 wherein the solid-state circuitry also includes a peak detector for producing the biasing potential for triggering periodic discharge of the condenser through the rectifier and pulse transformer.

5. An ignition system as specified in claim 2 wherein the electro-magnetic timing device is mechanically adjustable to shift, over a range defined by the time interval between the rectified condenser charging voltage pulses, the time base of the biasing potential so that its application to the rectifier gate provides large spark advance-retard capability.

6. An ignition system as specified in claim 1 wherein the electro-magnetic generators together comprise a fixed central stator having at least two coils having different inductances for producing the respective supply voltages, and a rotatable ring with permanent magnet means encircling said stator and driven by the engine.

7. An ignition system as specified in claim 1 wherein each combustion chamber is provided with two spark plugs for dual-ignition operation and each of said plugs is individually connected to a control network, the switching means for controlling condenser discharge including a gate-controlled rectifier for each condenser, and a bifilar coil for generating timed voltage pulses according to engine speed, the bifilar windings of said coil producing respectively simultaneous trigger pulses for the respective gates of the rectifiers whereby the two plugs are fired together.

8. An ignition system of the condenser discharge type for firing the spark plugs of a dual-ignition internal combustion engine comprising a source of voltage for condenser charging, a condenser and a pulse transformer in the firing circuit of each spark plug, means maintaining constant the said charging voltage with respect to the engine speed for uniform firing of said plugs, electronic switching means for causing discharge of the condenser through the primary of said pulse transformer for producing the plug firing voltage, and a timer driven from the engine for producing a trigger signal for causing the electronic switching means to discharge the condenser, said timer having a bifilar coil for generating simultaneous trigger pulses, one winding of said coil controlling the firing of one plug, and the other winding controlling the firing of the companion dual-ignition plug.

9. An ignition system as specified in claim 8 wherein the timer comprises a permanent magnet, a magnetic circuit structure therefore including a plurality of spaced pins corresponding in number to the cylinders of the engine, each pin forming the central core of a bifilar coil, and an armature movable according to engine speed with respect to said pins for completing sequentially at each pin a magnetic circuit whereby the simultaneous trigger pulses are generated in the respective windings of a bifilar coil.

10. An ignition system as specified in claim 9 wherein the magnetic circuit structure including said pins is adjustable with respect to the engine-connected armature whereby the trigger pulses can be shifted along their time base for spark advance-retard capability.

References Cited

UNITED STATES PATENTS

| | | | |
|---|---|---|---|
| 2,278,489 | 4/1942 | Rawlings | 310—154 |
| 2,602,149 | 7/1952 | Brunelle et al. | 123—148 X |
| 3,034,018 | 5/1962 | Rosenberg | 123—148 X |
| 3,186,387 | 6/1965 | Loudon | 123—148 |
| 3,240,198 | 3/1966 | Loudon et al. | 123—148 |

MARK NEWMAN, *Primary Examiner.*

LAURENCE M. GOODRIDGE, *Examiner.*